United States Patent [19]

Hoult

[11] Patent Number: 4,881,814
[45] Date of Patent: Nov. 21, 1989

[54] SCANNING MICHELSON INTERFEROMETER ASSEMBLY

[75] Inventor: Robert A. Hoult, Bethel, Conn.

[73] Assignee: The Perkin-Elmer Corporation, Norwalk, Conn.

[21] Appl. No.: 239,871

[22] Filed: Sep. 2, 1988

[51] Int. Cl.$^4$ ............................ G01B 9/02; G01J 3/45
[52] U.S. Cl. .................................... 356/346; 350/633
[58] Field of Search ................. 356/346; 350/633, 636

[56] References Cited

U.S. PATENT DOCUMENTS 4,621,899  11/1986  Hoult et al. .

FOREIGN PATENT DOCUMENTS 2162334  1/1986  United Kingdom .
2163548  2/1986  United Kingdom ................. 356/346

OTHER PUBLICATIONS

Rapid Scan Phase Modulator for Interferometric Applications by Campbell, Krug et al.; Applied Optics, vol. 20, No. 2, Jan. 15, 1981.

Primary Examiner—Davis L. Willis
Assistant Examiner—Matthew W. Koren
Attorney, Agent, or Firm—Edwin T. Grimes

[57] ABSTRACT

The invention is directed to a scanning Michelson type interferometer assembly which includes a beam splitter assembly for receiving a beam of radiation from a source, a stationary plane mirror for receiving and returning a first subbeam over a fixed optical path from the beam splitter assembly and an adjustable plane mirror for receiving and returning a second subbeam over a variable length optical path from the beam splitter, a system for receiving the combined output beam from the beam splitter assembly for forming a spectrum of the input beam radiation, a path difference generator having a pair of parallel spaced mirrors mounted so that the second subbeam is incident on one mirror and is reflected by both mirrors so as to emerage from this direction of incidence, the beam splitter assembly and the stationary plane mirror and the adjustable plane mirror as well as the optical path difference generator assembly being all mounted on a single, rigid monolithic structural frame to provide stability for the entire assembly, pins for forming a tapered track between the monolithic structural frame and the adjustable mirror, a ball mounted for sliding movement in the track, and a differential screw connected to the ball for driving the ball in the track to thereby adjust the tilt of the adjustable mirror, an E-shaped body portion mounted on the monolithic structural frame, which carries a pair of permanent magnets to provide an inwardly directed magnetic field, a scan motor armature coil assembly being mounted on the path difference generator assembly for movement perpendicular to the magnetic field when current is applied assembly in a direction substantially parallel to the to the coils, thereby to rotate the generator assembly, the beam splitter assembly including a beam splitter plate having a beam splitting coating on one surface, and a ring having an optical surface for receiving the plate, the monolithic structural frame having three spaced pads so that the optical surface if the ring can be flexably retained thereon for sliding radial movement due to thermal differential expansion, and a compensator plate being mounted adjacent the beam splitter plate for compensating for optical distortions of the beam of radiation due to the beam splitter plate.

16 Claims, 4 Drawing Sheets

SCANNING MICHELSON INTERFEROMETER ASSEMBLY

FIELD OF INVENTION

This invention relates to interferometers and, more particularly, to a scanning Michelson type interferometer assembly.

BACKGROUND OF THE INVENTION

A scanning Michelson interferometer is the type of instrument wherein an input beam of radiation, which is to be analyzed spectrally, is divided into two subbeams by a beam splitter, one subbeam being reflected back to the beam splitter along a path of fixed optical length and the other subbeam being reflected back to the beam splitter along a path of variable optical length for recombination with the first subbeam to form concentric circular interference fringes on a radiation detector. The variation in detector output as a function of the varied path length can be analyzed by suitable known Fourier transform methods to yield the spectrum of the input radiation beam.

Various devices have been used for varying the optical path length of one arm. For example, UK patent application GB No. 2162334A published Jan. 29, 1986 and an article entitled "RAPID SCAN PHASE MODULATOR FOR INTERFEROMETRIC APPLICATIONS" by D. J. Campbell, P. A. Krug et al appearing in Applied Optics, Vol. 20, No. 2, Jan. 15, 1981 describe modulators which consist of two mirrors mounted parallel to and facing each other on a rotating platform. Rotation of the platform varies the optical path length provided the rotation produces a change in the angle of incidence of the incoming beam on the first mirror.

Robert A. Hoult and Charles F. deMey's U.S. Pat. No. 4,621,899 entitled "ASSEMBLY FOR POSITIONING AN OPTICAL ELEMENT" dated Nov. 11, 1986 shows a very accurate system for mounting an optical element on a frame member.

The present invention is directed to improvements over such prior art devices, as will become apparent as the description proceeds.

SUMMARY OF THE INVENTION

Briefly, this invention contemplates the provision of a new and improved scanning Michelson type interferometer assembly which includes a beam splitter assembly for receiving a beam of radiation from a source, a stationary plane mirror for receiving and returning a first subbeam over a fixed optical path from the beam splitter assembly and an adjustable plane mirror for receiving and returning a second subbeam over a variable length optical path from the beam splitter. The assembly further includes means for receiving a combined output beam from the beam splitter assembly for forming a spectrum of the input beam radiation. In addition, an optical path difference generator assembly is mounted in the second subbeam path between the beam splitter and the adjustable plane mirror. This path difference generator has a pair of parallel spaced mirrors mounted so that the second subbeam is incident on one mirror and is reflected by both mirrors so as to emerge from this assembly in a direction substantially parallel to the direction of incidence. The assembly is provided with drive means for rotating the difference generator assembly about an axis of rotation so as to change the angle of incidence of the second subbeam on the first of the parallel mirrors to thereby vary the optical path length of the second subbeam. The beam splitter assembly and the stationary plane mirror and the adjustable plane mirror as well as the optical path difference generator assembly are all mounted on a single monolithic structural frame. This unitary, rigid structure provides stability for the entire assembly. According to one aspect of the invention, the means for adjusting the adjustable plane mirror includes means for forming a tapered track between the monolithic structural frame and the adjustable mirror, ball means mounted for sliding movement in the track, and differential screw means connected to the ball means for driving the ball in the track to thereby adjust the tilt of the mirror.

According to another aspect of the invention, the drive means for rotating the differential generator assembly includes an E-shaped body portion mounted on the monolithic structural frame, which carries a pair of permanent magnets to provide an inwardly directed magnetic field. A scan motor armature coil assembly is mounted on the path difference generator assembly for movement perpendicular to the magnetic field when current is applied to the coils, thereby to rotate the generator assembly.

According to still another aspect of the invention, the beam splitter assembly includes a beam splitter plate having a beam splitting coating on one surface, and a ring having an optical surface for receiving the plate. The monolithic structural frame has three spaced pads so that the optical surface of the ring can be flexibly retained thereon for sliding radial movement due to thermal differential expansion. Also, a compensator plate is mounted adjacent the beam splitter plate for compensating for optical distortions of the beam of radiation due to the beam splitter plate.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other assemblies and routines for carrying out the various purposes of the invention. It is important, therefore, that this disclosure be regarded as including such equivalent assemblies and routines as do not depart from the spirit and scope of the invention.

One embodiment of the invention has been chosen for purposes of illustration and description, and is shown in the accompanying drawings forming a part of the specification.

BRIEF DESCRIPTION OF THE DRAWINGS

The drawings, not drawn to scale, include.

DETAILED DESCRIPTION OF A PRESENTLY PREFERRED EMBODIMENT OF THE INVENTION

Figure 1:
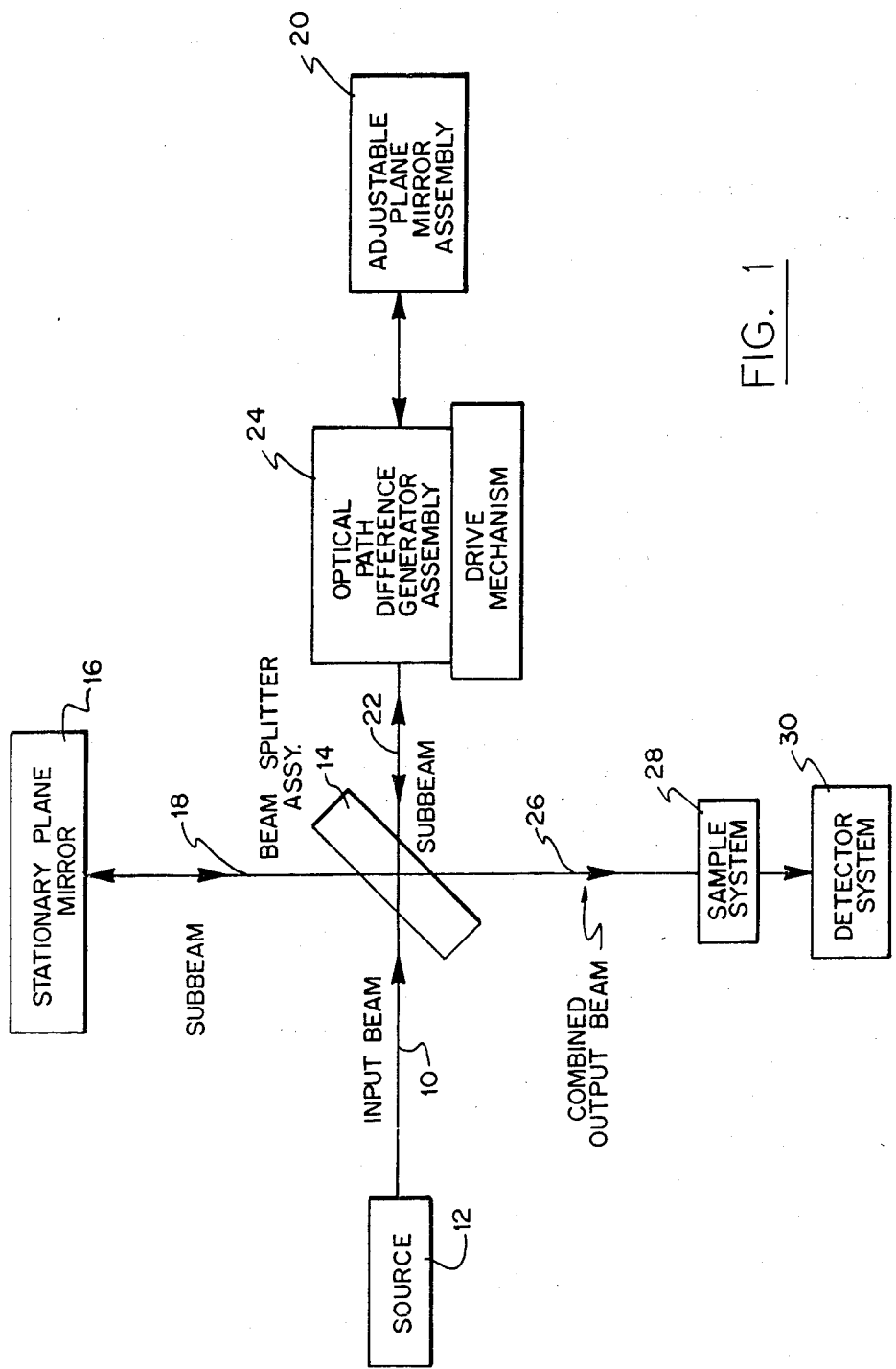
FIG. 1, which is a block diagram of a scanning Michelson type interferometer assembly according to the invention.

FIG. 1 is a block diagram of a scanning Michelson interferometer showing the general principles of the present invention. An input beam 10 of infrared radiation from a source 12 engages a beam splitter assembly 14. A stationary plane mirror 16 receives and returns a first subbeam 18 over a fixed length optical path from said beam splitter. An adjustable plane mirror 20 receives and returns a second subbeam 22 over a variable length optical path from said beam splitter. For purposes of varying the length of the optical path of the second subbeam 12 between the beam splitter 14 and the adjustable plane mirror 20 is an optical path difference generator assembly and drive mechanism 24. Subbeam 18 and subbeam 22 form a combined beam 26 which passes through a sample system 28 whose absorption spectrum is to be measured. Detector system 30 provides the output.

Figure 2:
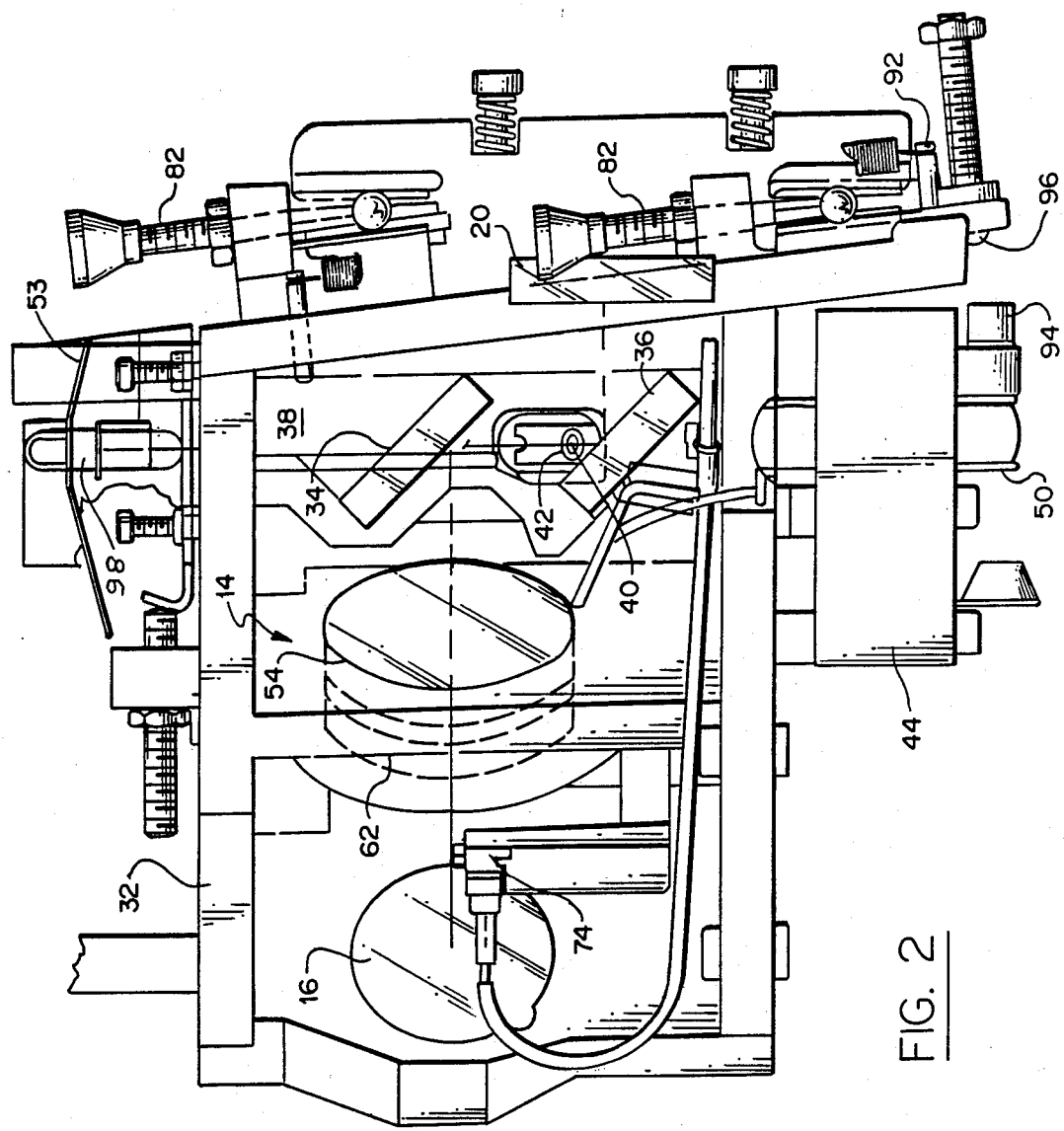
FIG. 2, which is side elevation, partially in section, of the interferometer assembly of FIG. 1.

It will be appreciated that the interferometer of the present invention is constructed from a monolithic structural frame, which provides operational stability. That is, as seen in FIG. 2, a rigid monolithic structural frame 32 is provided upon which the major elements are mounted.

Figure 3:
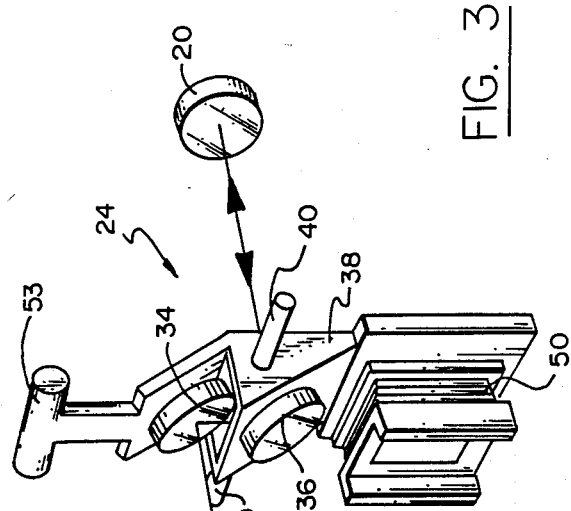
FIG. 3, which is a perspective view of the optical path difference generator assembly according to the invention.
Figure 4:
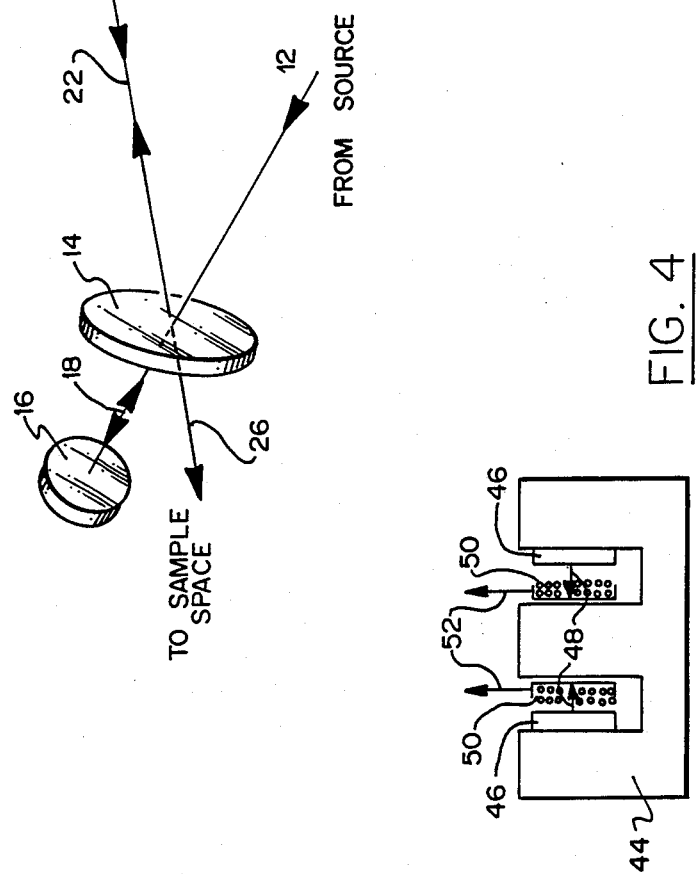
FIG. 4, which is a medial sectional view of the drive means for the path difference generator assembly of FIG. 3.

As best seen in FIG. 3, the optical path difference generator assembly and drive mechanism 24 includes a pair of parallel spaced mirrors 34 and 36 mounted on a support member 38 so that the second subbeam 22 is incident on mirror 34 and then reflected to mirror 36 from which it emerges in a direction parallel to the direction of incidence on the first mirror 34. A pair of protruding pins 40, extending from the support member 38, are mounted in V-blocks 42 fixedly mounted on the structural frame 32, as seen in FIG. 2. The pins are of small diameter and, as a result, the rotational friction is minimized. This forms an axis of rotation which is substantially parallel to the surfaces of the parallel mirrors 34 and 36 and normal to the input portion of the second subbeam incident on mirror 34. A drive mechanism or scan motor is provided for rotating the optical path difference generator assembly through an arc of about 8 degrees to provide the desired optical path difference. The drive mechanisim includes an E-shaped body portion 44, FIG. 4, upon which permanent magnets 46 are mounted. These magnets have an inwardly directed magnetic force or field as indicated by arrows 48. The body portion 44 is fixedly mounted on the monolithic structural frame 32, FIG. 2. A scan motor armature assembly or coil 50 is mounted on the support member 38, FIG. 3, and as shown in FIG. 4 moves linearly as indicated by arrows 52 when current is applied. The assembly is constructed and arranged so that movement of the coil as indicated by arrows 52, FIG. 4, serves to rotate the support member 38, FIG. 3, about the axis formed by the pins 40, thereby to vary the optical path length of the subbeam 22, FIG. 1.

As best seen in FIG. 3, the support member 38 is provided with an upper counterweight 53 which tends to make the member immune to outside sudden acceleration, vibration or shock forces, thereby providing stability to the system.

Figure 5:
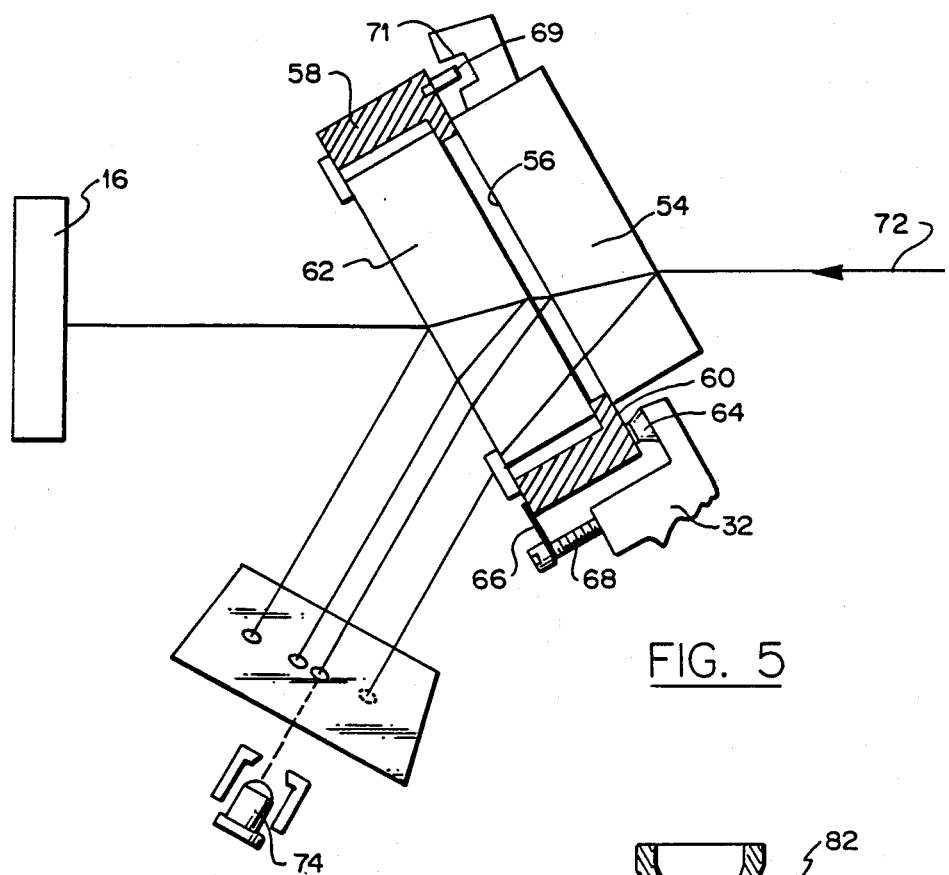
FIG. 5, which is a medial sectional view of the mounting means for the beam splitter assembly.

Referring next to FIG. 5, details of the beam splitter assembly and mounting are shown. The beam splitter includes two parts, i.e. a beam splitter plate 54, which is a thick piece of potassium bromide with a coating surface of germanium 56. The coating surface is the active or beam splitting surface. The plate 54 is mounted on a ring 58, which has a ground, lapped surface 60. That is, the coating surface sits flat on the lapped stainless steel ring 58. To compensate optically for the beam splitter plate 54, a compensator plate 62 is provided. This plate is also fabricated from potassium bromide and is the same thickness as plate 54. The coating surface 56 sits flat on the ground, lapped surface 60. This lapped surface is also mounted on the monolithic structural frame 32 by means of three equally spaced pads 64. It will be appreciated that the principal problems of stability in an interferometer of this type are caused by temperature change. The effect of this temperature change causes differential expansion between the different materials employed. As a result it is desirable to prevent the differential expansion from affecting the orientation of the beam splitter. Since both the coating surface 56 and the pads 64 rest on the same lapped surface 60, then any differential expansion will be essentially radially inwardly or outwardly. As a result there is pure sliding action between the two optically flat surfaces. This substantially reduces the lifting or rotating action. Thus, the beam splitter surface remains parallel to itself throughout any expansion or contraction. This provides long term stability. Since it is known that there will be some expansion, the ring 58 is not held down tight against the pads 64. A leaf spring 66 is carried by a pin 68 on the frame 32 to frictionally engage the ring 58. To be sure the ring is positioned correctly, locating pins 69, carried by the ring, are loosely positioned in holes 71 in the plate 54.

Still referring to FIG. 5, in addition to the input of infrared radiation to the main body of the beam splitter plate 54, a range finder laser beam 72 is directed towards the periphery of the plate for purposes of determining the changes in the optical path length of the second subbeam. The portion of the beam splitter plate 54 through which the laser beam passes is not coated with germanium 56. The potassium bromide provides about 4% reflection of the laser beam, which is sufficient for alignment and range finding purposes. There are actually four recombined beams outputted from the beam splitter. However, the one from the inside surface of the plate 54 is presently preferred for detecting by the fringe detector 74, as shown in FIG. 5.

Figure 6:
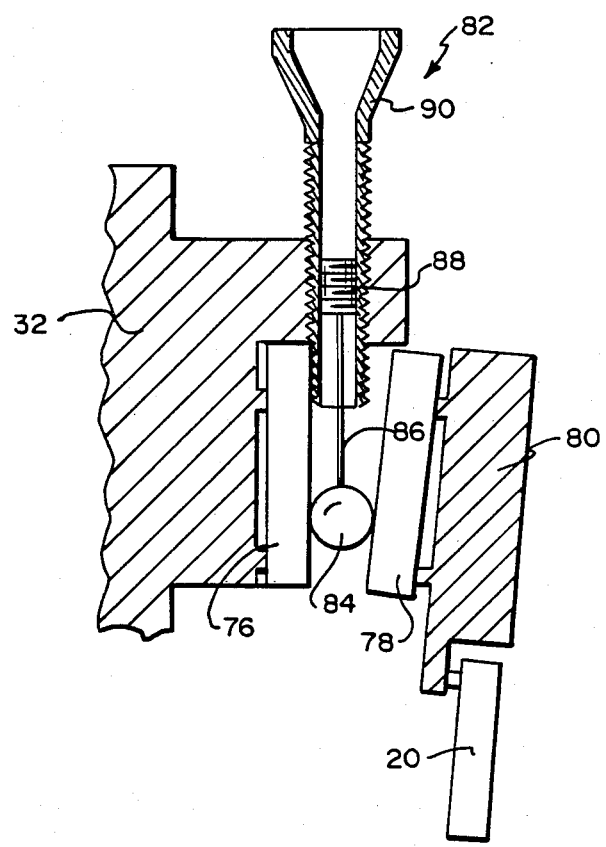
FIG. 6, is a medial cross sectional view of the adjustment means for the adjustable plane mirror.

FIG. 6 shows in detail an adjustment mechanism for the adjustable plane mirror 20. Two parallel hardened pins 76 are fixedly mounted on the monolithic structure frame 32, and two parallel hardened pins 78 are fixedly mounted on mirror mounting bracket 80, which fixedly carries the adjustable plane mirror 20. The two parallel pins 76 are disposed at an angle of about 6 degrees form the two parallel pins 78 to form a tapered track therebetween. A differential screw, indicated at 82 in FIG. 6, carries a ball 84 mounted in the track formed by the pins 76 and 78. That is, the ball 84 is fixedly attached to one end of a rigid stem 86, which has a central actuator or fine set screw at other end thereof. The set screw 88 threadably engages an outer set screw or sleeve 90 which, in turn, threadably engages the monolithic structure frame 32. The threads between the inner set screw 88 and the outer set screw 90 have 40 turns per inch, whereas the threads between the outer set screw 90 and the frame 32 have 32 turns per inch. This provides a differential of 160 turns per inch. In operation the coarse adjustment is made by turning the inner screw 88 with an appropriate Allen wrench and then making the fine adjustment by turning the outer screw 90. That is, when turning the outer thread, the ball is trapped between the pins and therefor is held so that it does not rotate, which means that the central set screw stays motionless and the outside of the sleeve moves at 32 threads per inch and the inside of the sleeve moves at 40 threads per inch. They move in opposite direction and thus the difference between the two gives a net result of 160 threads per inch. As seen in FIG. 2 there are two adjustment mechanisms, at two opposite corners for the adjustable plane mirror 20. The adjustable plane mirror is pivotally mounted at a third corner 92 between the two adjustment mechanisms so that by selective adjustment of the two adjustment mechanisms the mirror can be tilted in two degrees of tilt. This provides very good control of the optical alignment of the system.

Referring again to FIG. 2, the support member 38 for the parallel mirrors is provided with a bumper 94 which engages with an adjustable end stop 96 carried by the monolithic structural frame 32. There is a unique point in the travel of the system and that is where the optical paths of the two subbeams are equal. This is used as the center of the scan. This point can not be set up exactly by the machine due to the accumulation of tolerances. In operation, the adjustable end stop 96 is set so that the center of the scan is a preselected fixed distance from the end. In this manner the center point can be determined within a few microns. A closer indication of the location of the center point is made by means of an adjustable optical interrupter assembly 98. This assembly includes a beam of light, which is interrupted when the counterweight 53 passes therethrough. This indicates to within approximately one micron the location of the center point of the scan.

The monolithic structural frame 32 supports the beam splitter assembly 14, the stationary or fixed mirror 16, the mounting points for the adjustable mirror 20, and the pivot points for the optical path difference generator assembly 24. This unitary, rigid structure provides stability for the interferometer assembly. The assembly has high thermal stability particularly in view of the beamsplitter mounting arrangement as described in detail hereinbefore. The mirror adjustments serve to control the optical alignment of the system.

Although a certain particular embodiment of the invention is herein disclosed for purposes of explanation, further modification thereof, after study of this specification, will be apparent to those skilled in the interferometer art to which the invention pertains. Reference should accordingly be had to the appended claims in determining the scope of the invention.

What is claimed is:

1. A scanning Michelson type interferometer assembly comprising, in combination: a beam splitter assembly for receiving a beam of radiation from a source, a stationary plane mirror for receiving and returning a first subbeam over a fixed length optical path from said beam splitter assembly, an adjustable plane mirror for receiving and returning a second subbeam over a variable length optical path from said beam splitter assembly, means for receiving a combined output beam from said beam splitter assembly for forming a spectrum of the input beam radiation, an optical path difference generator assembly mounted in said second subbeam path between said beam splitter assembly and said adjustable plane mirror, said optical path difference generator assembly having a pair of parallel spaced mirrors mounted so that said second subbeam is incident on one mirror and is reflected by both of said parallel mirrors to emerge from the generator assembly in a direction substantially parallel to the direction of incidence on the one mirror, drive means for rotating said generator assembly about an axis of rotation so as to change the angle of incidence of the second subbeam on said one mirror and thereby vary the optical path length of the second subbeam, said beam splitter assembly and said stationary plane mirror and said adjustable plane mirror and said optical path difference generator assembly being mounted on a monolithic structural frame, means for adjusting said adjustable plane mirror including means interposed between said monolithic structural frame and said adjustable plane mirror forming a tapered track therebetween, ball means mounted for sliding movement in said track, and differential screw means connected to said ball means for driving said ball in said track, thereby to adjust the tilt of said adjustable plane mirror to make it perpendicular to the second subbeam exiting the optical path difference generator assembly.

2. A scanning Michelson type interferometer assembly according to claim 1 wherein said means interposed between said monolithic structural frame and said adjustable plane mirror comprises a first set of two parallel pins fixedly mounted on said structural frame and a second set of two parallel pins fixedly mounted on said adjustable plane mirror, said first set and said second set of pins being disposed at an angle with respect to each other to form said tapered track.

3. A scanning Michelson type interferometer assembly according to claim 1 wherein said drive means comprises an E-shaped body portion mounted on said monolithic structural frame, a pair of permanent magnets mounted on said body portion to provied a magnetic field directed inwardly toward the center of said E, a scan motor armature coil assembly mounted on said optical path difference generator assembly for movement perpendicular to said magnetic field when current is applied to said coils, thereby to rotate said generator assembly.

4. A scanning Michelson type interferometer assembly according to claim 3 wherein said optical path difference generator assembly includes a pair of spaced protruding small diameter pins and wherein said monolithic structural frame includes a pair of V-blocks for receiving said pins respectively to form an axis of rotation substantially parallel to the mirror surfaces of said parallel mirrors and normal to the path of said second subbeam.

5. A scanning Michelson type interferometer assembly according to claim 4 wherein said optical path difference generator assembly includes a counterweight for balancing said generator assembly about its axis of rotation, thereby providing substantial immunity to vibration and shock.

6. A scanning Michelson type interferometer assembly according to claim 3 wherein said beam splitter assembly includes a beam splitter plate having a beam splitting coating on one surface, a ring having an optical surface for receiving said plate, said monolithic structural frame having three spaced pads, the optical surface of said ring being flexibly retained on said pads for sliding radial movement due to relative thermal differential expansion, a compensator plate mounted on said ring adjacent said beam splitter plate, said compensator plate being optically substantially the same as said beam splitter plate but without the beam splitter coating to compensate for optical distortions of the beam of radiation due to the beam splitter plate.

7. A scanning Michelson type interferometer assembly according to claim 6 wherein said ring has a projecting locating pin and said beam splitter plate has a mating locating opening to receive said pin for positioning said beam splitter plate with respect to said ring.

8. A scanning Michelson type interferometer assembly according to claim 7 wherein said optical path difference generator assembly includes a protruding bumper and said monolithic structural frame includes a mating adjustable end stop for determining the center of the scan.

9. A scanning Michelson type interferometer assembly according to claim 8 wherein an adjustable optical interrupter assembly is mounted on said monolithic structural frame, said interrupter assembly emitting a beam of light which is interruptable by movement of said optical path difference generator assembly, thereby to determine the position of said interrupter assembly with respect to said monolithic structural frame.

10. A scanning Michelson type interferometer assembly comprising, in combination:
a beam splitter assembly for receiving a beam of radiation from a source, a stationary plane mirror for receiving and returning a first subbeam over a fixed length optical path from said beam splitter assembly, an adjustable plane mirror for receiving and returning a second subbeam over a variable length optical path from said beam splitter assembly, means for receiving a combined output beam from said beam splitter assembly for forming a spectrum of the input beam radiation, an optical path difference generator assembly mounted in said second subbeam path between said beam splitter assembly and said adjustable plane mirror, said optical path difference generator assembly having a pair of parallel spaced mirrors mounted so that said second subbeam is incident on one mirror and is reflected by both of said parallel mirrors to emerage from the generator assembly in a direction substantially parallel to the direction of incidence on the one mirror, drive means for rotating said generator assembly about an axis of rotation so as to change the angle of incidence of the second subbeam on said one mirror and thereby vary the optical path length of the second subbeam, said beam splitter assembly and said stationary plane mirror and said adjustable plane mirror and said optical path difference generator assembly being mounted on a monolithic structural frame, said beam splitter assembly including a beam splitter plate having a beam splitting coating on one surface, a ring having an optical surface for receiving said plate, said monolithic structural frame having three space pads, the optical surface of said ring being flexible retained on said pads for sliding radial movement due to relative thermal differential expansion, a compensator plate being optically substantially the same as said beam splitter plate but without the beam splitter coating to compensate for optical distortions of the beam of radiation due to the beam splitter plate.

11. A scanning Michelson type interferometer assembly according to claim 10 wherein said ring has a projecting locating pin and said beam splitter plate has a mating locating opening to receive said pin for positioning said beam splitter plate with respect to said ring.

12. A scanning Michelson type interferometer assembly according to claim 10 wherein said drive means comprises an E-shaped body portion mounted on said monolithic structural frame, a pair of permanent magnets mounted on said body portion to provide a magnetic field directed inwardly toward the center of said E, a scan motor armature coil assembly mounted on said optical path difference generator assembly for movement perpendicular to said magnetic field when current is applied to said coils, thereby to rotate said generator assembly.

13. A scanning Michelson type interferometer assembly according to claim 10 wherein a portion of said beam splitter plate surface is devoid of said beam splitting coating, and wherein said interferometer assembly further includes means for projecting a laser beam onto said devoid portion of said beam splitter plate and through said interferometer substantially parallel to said beam of radiation, laser beam detector means for receiving a combined output laser beam from the beam splitter assembly for determing system alignment and length of said variable length optical path.

14. A scanning Michelson type interferometer assembly comprising, in combination:
a beam splitter assembly for receiving a beam of radiation from a source, a stationary plane mirror for receiving and returning a first subbeam over a fixed length optical path from said beam splitter assembly, an adjustable plane mirror for receiving and returning a second subbeam over a variable length optical path from said beam splitter assembly, means for receiving a combined output beam from said beam splitter assembly for forming a spectrum of the input beam radiation, an optical path difference generator assembly mounted in said second subbeam path between said beam splitter assembly and said adjustable plane mirror, said optical path difference generator assembly having a pair of parallel spaced mirrors mounted so that said second subbeam is incident on one mirror and is reflected by both of said parallel mirrors to emerage from the generator assembly in a direction substantially parallel to the direction of incidence on the one mirror, drive means for rotating said generator assembly about an axis of rotation so as to change the angle of incidence of the second subbeam on said one mirror and thereby vary the optical path length of the second subbeam, said beam splitter assembly and said stationary plane mirror and said adjustable plane mirror and said optical path difference generator assembly being mounted on a monolithic structural frame, said drive means comprising an E-shaped body portion mounted on said monolithic structural frame, a pair of permanent magnets mounted on said body portion to provide a magnetic field directed inwardly toward the center of said E, a scan motor armature coil assembly mounted on said optical path difference generator assembly for movement perpendicular to said magnetic field when current is applied to said coils, thereby to rotate said generator assembly.

15. A scanning Michelson type interferometer assembly according to claim 14 wherein said optical path difference generator assembly includes a pair of spaced protruding pins and wherein said monolithic structural frame includes a pair of V-blocks for receiving said pins respectively to form an axis of rotation substantially parallel to the mirror surfaces of said parallel mirrors and normal to the path of said second subbeam.

16. A scannning Michelson type interferometer assembly according to claim 14 wherein said optical path difference generator assembly includes a counterweight for balancing said generator assembly about its axis of rotation, thereby providing substantial immunity to vibration and shock.

* * * * *